United States Patent
Wang

[11] Patent Number: 6,098,130
[45] Date of Patent: Aug. 1, 2000

[54] APPARATUS FOR CONVERTING GAME INPUT PORT SIGNALS FROM A GAME CONTROLLER INTO UNIVERSAL SERIAL BUS PORT SIGNALS

[76] Inventor: Jen-Che Wang, 2F, No. 40, Lane 46, Shih-Tung Rd., Shih-Lin Dist., Taipei City, Taiwan

[21] Appl. No.: 09/162,884

[22] Filed: Sep. 29, 1998

[30] Foreign Application Priority Data

May 29, 1998 [TW] Taiwan .................................. 87208490

[51] Int. Cl.[7] .............................. G06F 13/00; G06F 3/00; H03M 1/02
[52] U.S. Cl. ................................ 710/100; 710/63; 463/38
[58] Field of Search .................................. 710/100, 3, 15, 710/30, 63, 65, 72; 709/301; 463/36–38; 348/14, 552; 379/93.13; 455/6.3; 341/155

[56] References Cited

U.S. PATENT DOCUMENTS

| | | |
|---|---|---|
| 5,722,041 | 2/1998 | Freadman . |
| 5,761,537 | 6/1998 | Sturges et al. . |
| 5,787,259 | 7/1998 | Haroun et al. . |
| 5,903,777 | 5/1999 | Brief . |
| 5,935,224 | 8/1999 | Svancarek et al. . |
| 5,944,840 | 8/1999 | Lever . |
| 5,958,020 | 9/1999 | Evoy et al. . |

*Primary Examiner*—Gopal C. Ray
*Attorney, Agent, or Firm*—Harness, Dickey & Pierce, P.L.C.

[57] ABSTRACT

An apparatus is provided for converting game port input signals from a game controller into universal serial bus (USB) port signals. The apparatus includes an input unit adapted to be connected to the game controller so as to receive the game port input signals therefrom, an analog-to-digital converter for receiving analog axis signals of the game port input signals from the input unit and for converting the analog axis signals into digital axis signals in a USB interface standard-compliant format, a key signal converter for receiving key switch signals of the game port input signals from the input unit and for converting the key switch signals into digital key switch signals in the USB interface standard-compliant format, a USB driver for receiving the digital axis signals and the digital key switch signals and for generating the USB port signals, and an output unit connected to the USB driver and adapted to provide the USB signals to a USB port.

5 Claims, 1 Drawing Sheet

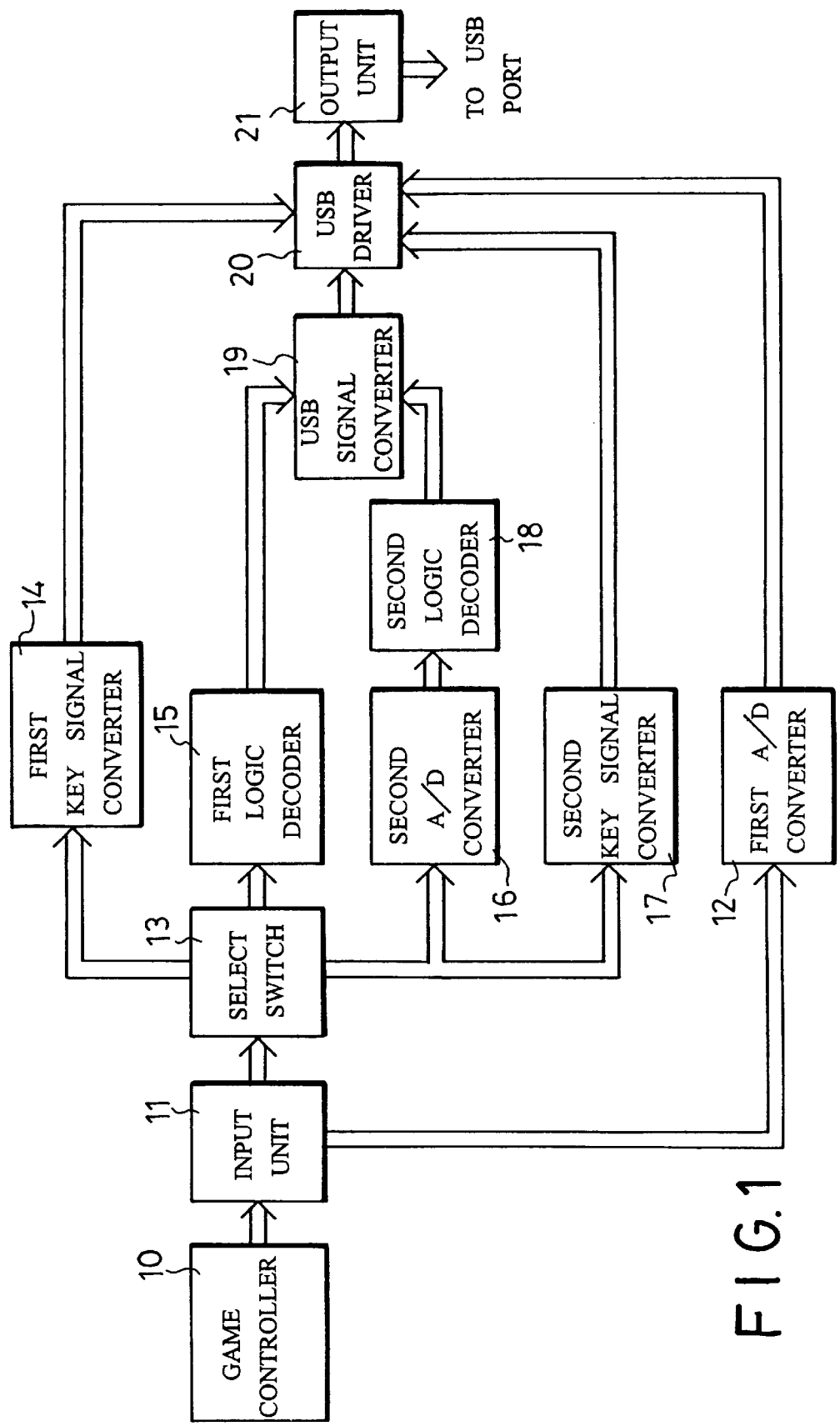
F I G. 1

APPARATUS FOR CONVERTING GAME INPUT PORT SIGNALS FROM A GAME CONTROLLER INTO UNIVERSAL SERIAL BUS PORT SIGNALS

BACKGROUND OF THE INVENTION

1. Field of the Invention

The invention relates to game controllers, more particularly to an apparatus for converting game port input signals from a game controller into universal serial bus (USB) port signals.

2. Description of the Related Art

Recent developments in the computer industry have resulted in a new interface standard, namely the universal serial bus (USB) interface standard. As such, more and more hardware and software manufacturers are coming up with new products that comply with the USB interface standard.

Presently, most commercial game controllers, such as joysticks or steering wheel operating sticks, are designed for connection to the game port of a personal computer. However, due to the increasing popularity of the USB interface standard, owners of game port-compliant game controllers would eventually have to purchase new game controllers that comply with the USB interface standard. It is therefore desirable to find some way that would permit use of game port-compliant game controllers with the USB port.

SUMMARY OF THE INVENTION

Therefore, the main object of the present invention is to provide an apparatus for converting game port input signals from a game controller into universal serial bus (USB) port signals.

Another object of the present invention is to provide an apparatus of the aforementioned type that is suitable for use with game controllers that may or may not have a viewing angle selection capability.

According to an illustrative embodiment of the present invention, an apparatus is capable of converting game port input signals from a game controller into universal serial bus (USB) port signals. The game controller is one of a first type having the game port input signals that consist of key switch signals and analog axis signals, a second type having the game port input signals that consist of key switch signals, analog axis signals and digital viewing angle control signals, and a third type having the game port input signals that consist of key switch signals, analog axis signals and analog viewing angle control signals. The apparatus comprises an input unit, a first analog-to-digital (A/D) converter, a select switch, a first key signal converter, a first logic decoder, a second A/D converter, a second logic decoder, a second key signal converter, a USB signal converter, a USB driver, and an output unit.

The input unit is adapted to be connected to the game controller so as to receive the game port input signals therefrom.

The first A/D converter is connected to the input unit, and receives the analog axis signals of the game port input signals from the input unit for converting the analog axis signals into digital axis signals in a USB interface standard-compliant format.

The select switch is connected to the input unit, and is operable in a first switch position when the game controller of the first type is connected to the input unit, a second switch position when the game controller of the second type is connected to the input unit, and a third switch position when the game controller of the third type is connected to the input unit.

The first key signal converter is connected by the select switch to the input unit when the select switch is operated in the first switch position. The first key signal converter receives the key switch signals of the game controller of the first type from the input unit, and converts the key switch signals of the game controller of the first type into digital key switch signals in the USB interface standard-compliant format.

The first logic decoder is connected by the select switch to the input unit when the select switch is operated in the second switch position. The first logic decoder converts the key switch signals and the viewing angle control signals of the game controller of the second type into decoded key switch signals and decoded viewing angle select signals.

The second A/D converter is connected by the select switch to the input unit when the select switch is operated in the third switch position. The second A/D converter receives the viewing angle control signals of the game controller of the third type from the input unit, and converts the viewing angle control signals of the game controller of the third type into digitized viewing angle control signals.

The second logic decoder is connected to the second A/D converter, and converts the digitized viewing angle control signals into decoded viewing angle select signals.

The second key signal converter is connected by the select switch to the input unit when the select switch is operated in the third switch position. The second key signal converter receives the key switch signals of the game controller of the third type from the input unit, and converts the key switch signals of the game controller of the third type into digital key switch signals in the USB interface standard-compliant format.

The USB signal converter is connected to the first and second logic decoders, and converts the decoded key switch signals and the decoded viewing angle select signals from the first logic decoder into digital key switch signals and digital viewing angle select signals in the USB interface standard-compliant format, and further converts the decoded viewing angle select signals from the second logic decoder into digital viewing angle select signals in the USB interface standard-compliant format.

The USB driver is connected to the first A/D converter, the first key signal converter, the second key signal converter and the USB signal converter, and receives the digital axis signals, the digital key switch signals and the digital viewing angle select signals for generating the USB port signals.

The output unit is connected to the USB driver and is adapted to provide the USB signals to a USB port.

BRIEF DESCRIPTION OF THE DRAWING

Other features and advantages of the present invention will become apparent in the following detailed description of the preferred embodiment with reference to the accompanying drawings, of which:

FIG. 1 is a schematic circuit block diagram of the preferred embodiment of an apparatus for converting game port input signals from a game controller into USB port signals in accordance with the present invention.

DETAILED DESCRIPTION OF THE PREFERRED EMBODIMENT

Referring to FIG. 1, the preferred embodiment of an apparatus for converting game port input signals from a game controller 10, such as a joystick or a steering wheel operating stick, into USB port signals that comply with the USB interface standard is shown to comprise an input unit 11, a first analog-to-digital (A/D) converter 12, a select switch 13, a first key signal converter 14, a first logic decoder 15, a second A/D converter 16, a second key signal converter 17, a second logic decoder 18, a USB signal converter 19, a USB driver 20, and an output unit 21.

The input unit 11 is adapted to be connected to the game controller 10 so as to receive game port input signals, including key switch signals and continuously changing analog axis signals, therefrom.

The first A/D converter 12 is connected to the input unit 11 and receives the analog axis signals therefrom. The first A/D converter 12 converts the analog axis signals into digital axis signals in a USB interface standard-compliant format.

In this embodiment, the select switch 13 is a three-position switch connected to the input unit 11 and operated according to the type of game controller 10 that is in use. The type of game controller 10 is determined according to the presence or absence of a viewing angle selection capability, and the viewing angle selection mode.

The first key signal converter 14 is connected to the select switch 13. Once the select switch 13 is operated in a first switch position, the first key signal converter 14 is connected to the input unit 11 so as to receive the key switch signals therefrom.

For a game controller 10 with no viewing angle selection capability, the key switch signals normally vary between 0 volt, indicative of a key-operated state, and 5 volts, indicative of a key-released state. As the USB port is not suited for receiving key switch signals in this format, the first key signal converter 14 is responsible for converting these key switch signals into digital key switch signals in the USB interface standard-compliant format.

Viewing angle selection is accomplished in a game controller 10, such as in a flight simulation joystick, by means of a thumb-actuated device, also known as a coolie hat, of the game controller 10. Presently, game controllers 10 can incorporate one of two viewing angle selection modes. The first mode is the CH-mode developed by CH Products, a U.S. based company. In the CH-mode, secondary key switches are employed to generate digital coded viewing angle control signals that indicate up, down, left and right operation of the thumb-actuated device. The second mode is the TM-mode developed by a company named Trust Master. In the TM-mode, variable resistors are employed to generate analog viewing angle control signals that represent up, down, left and right operation of the thumb-actuated device. The analog viewing angle control signals may be analog voltage signals obtained directly from the variable resistors. Alternatively, the analog viewing angle control signals may be frequency signals generated by a variable frequency oscillator that is controlled by the variable resistors.

The first logic decoder 15 is connected to the select switch 13. When a game controller 10 with a CH-mode viewing angle selection capability is in use, the select switch 13 is operated in a second switch position, thereby connecting the first logic decoder 15 to the input unit 11 so as to receive the key switch signals and the digital coded viewing angle control signals therefrom. At this time, the first logic decoder 15 is enabled to perform logic conversion, such as with the use of a look-up table, in order to decode the inputs thereto and obtain corresponding decoded key switch signals and decoded viewing angle select signals.

The second A/D converter 16 and the second key signal converter 17 are connected to the select switch 13. When a game controller 10 with a TM-mode viewing angle selection capability is in use, the select switch 12 is operated in a third switch position, thereby connecting the second A/D converter 16 and the second key signal converter 17 to the input unit 11. At this time, the second A/D converter 16 receives the analog viewing angle control signals from the input unit 11, and converts the same into corresponding digitized viewing angle control signals. The second logic decoder 18, which is connected to the output of the second A/D converter 16, then performs logic conversion, such as with the use of another look-up table, on the digitized viewing angle control signals from the second A/D converter 16 in order to decode the same and obtain corresponding decoded viewing angle select signals. In addition, the second key signal converter 17 receives the key switch signals from the input unit 11 and converts the latter into digital key switch signals in the USB interface standard-compliant format.

The USB signal converter 19 is connected to the first logic decoder 15 and the second logic decoder 18. When the select switch 13 is operated in the second switch position, the USB signal converter 19 converts the decoded key switch signals and the decoded viewing angle select signals from the first logic decoder 15 into digital key switch signals and digital viewing angle select signals in the USB interface standard-compliant format. When the select switch 13 is operated in the third switch position, the USB signal converter 19 converts the decoded viewing angle select signals from the second logic decoder 18 into digital viewing angle select signals in the USB interface standard-compliant format.

The USB driver 20 is connected to the first A/D converter 12, the first key signal converter 14, the second key signal converter 17 and the USB signal converter 19. The USB driver 20 receives the outputs of the converters 12, 14, 17, 19, and generates the corresponding USB port signals.

The output unit 21 is connected to the USB driver 20 and is adapted to provide the USB port signals from the USB driver 20 to a USB port (not shown) of a personal computer.

An important aspect to note is that the apparatus of this invention can be implemented entirely or in part as an applications specific integrated circuit (ASIC) or in a microprocessor-based controller, thereby reducing the size of the apparatus and effectively lowering production costs.

It has thus been shown that, through the apparatus of this invention, game port-compliant game controllers that may or may not have a viewing angle selection capability can be adapted for use with the USB port of a personal computer. The need to purchase new game controllers that comply with the USB interface standard has been eliminated to avoid unnecessary expense and waste. The objects of the invention are thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An apparatus for converting game port input signals from a game controller into universal serial bus (USB) port signals, said apparatus comprising:

an input unit adapted to be connected to the game controller so as to receive the game port input signals therefrom;

analog-to-digital converter means, connected to said input unit, for receiving analog axis signals of the game port input signals from said input unit and for converting the analog axis signals into digital axis signals in a USB interface standard-compliant format;

key signal converter means, connected to said input unit, for receiving key switch signals of the game port input signals from said input unit and for converting the key switch signals into digital key switch signals in the USB interface standard-compliant format;

a USB driver, connected to said analog-to-digital converter means and said key signal converter means, for receiving said digital axis signals and said digital key switch signals and for generating the USB port signals; and an output unit connected to said USB driver and adapted to provide the USB signals to a USB port.

2. An apparatus for converting game port input signals from a game controller into universal serial bus (USB) port signals, the game controller being one of a first type having the game port input signals that consist of key switch signals and analog axis signals, and a second type having the game port input signals that consist of key switch signals, analog axis signals and viewing angle control signals, said apparatus comprising:

an input unit adapted to be connected to the game controller so as to receive the game port input signals therefrom;

a first analog-to-digital converter, connected to said input unit, for receiving the analog axis signals of the game port input signals from said input unit and for converting the analog axis signals into digital axis signals in a USB interface standard-compliant format;

a select switch connected to said input unit and operable in a first switch position when the game controller of the first type is connected to said input unit, and in a second switch position when the game controller of the second type is connected to said input unit;

a first key signal converter connected by said select switch to said input unit when said select switch is operated in the first switch position, said first key signal converter receiving the key switch signals of the game controller of the first type from said input unit and converting the key switch signals of the game controller of the first type into digital key switch signals in the USB interface standard-compliant format;

key switch and control signal converting means connected by said select switch to said input unit when said select switch is operated in the second switch position, said key switch and signal converting means receiving the key switch signals and the viewing angle control signals of the game controller of the second type from said input unit and converting the key switch signals and the viewing angle control signals of the game controller of the second type into digital key switch signals and digital viewing angle select signals in the USB interface standard-compliant format;

a USB driver, connected to said first analog-to-digital converter, said first key signal converter, and said key switch and control signal converting means, for receiving said digital axis signals, said digital key switch signals, and said digital viewing angle select signals and for generating the USB port signals; and an output unit connected to said USB driver and adapted to provide the USB signals to a USB port.

3. The apparatus as claimed in claim 2, wherein said key switch and control signal converting means comprises:

a logic decoder, connected to said select switch, for converting the key switch signals and the viewing angle control signals of the game controller of the second type into decoded key switch signals and decoded viewing angle select signals; and a USB signal converter, interconnecting said logic decoder and said USB driver, for converting the decoded key switch signals and the decoded viewing angle select signals from said logic decoder into the digital key switch signals and the digital viewing angle select signals in the USB interface standard-compliant format.

4. The apparatus as claimed in claim 2, wherein said key switch and control signal converting means comprises:

a second analog-to-digital converter connected by said select switch to said input unit when said select switch is operated in the second switch position, said second analog-to-digital converter receiving the viewing angle control signals of the game controller of the second type from said input unit and converting the viewing angle control signals of the game controller of the second type into digitized viewing angle control signals;

a logic decoder, connected to said second analog-to-digital converter, for converting the digitized viewing angle control signals into decoded viewing angle select signals;

a USB signal converter, interconnecting said logic decoder and said USP driver, for converting the decoded viewing angle select signals into the digital viewing angle select signals in the USB interface standard-compliant format; and a second key signal converter connected by said select switch to said input unit when said select switch is operated in the second switch position, said second key signal converter being further connected to said USB driver and receiving the key switch signals of the game controller of the second type from said input unit and converting the key switch signals of the game controller of the second type into the digital key switch signals in the USB interface standard-compliant format.

5. An apparatus for converting game port input signals from a game controller into universal serial bus (USB) port signals, the game controller being one of a first type having the game port input signals that consist of key switch signals and analog axis signals, a second type having the game port input signals that consist of key switch signals, analog axis signals and digital viewing angle control signals, and a third type having the game port input signals that consist of key switch signals, analog axis signals and analog viewing angle control signals, said apparatus comprising:

an input unit adapted to be connected to the game controller so as to receive the game port input signals therefrom;

a first analog-to-digital converter, connected to said input unit, for receiving the analog axis signals of the game port input signals from said input unit and for converting the analog axis signals into digital axis signals in a USB interface standard-compliant format;

a select switch connected to said input unit and operable in a first switch position when the game controller of the first type is connected to said input unit, a second switch position when the game controller of the second type is connected to said input unit, and a third switch position when the game controller of the third type is connected to said input unit;

a first key signal converter connected by said select switch to said input unit when said select switch is operated in the first switch position, said first key signal converter receiving the key switch signals of the game controller of the first type from said input unit and converting the key switch signals of the game controller of the first type into digital key switch signals in the USB interface standard-compliant format;

a first logic decoder connected by said select switch to said input unit when said select switch is operated in the second switch position, said first logic decoder converting the key switch signals and the viewing angle control signals of the game controller of the second type into decoded key switch signals and decoded viewing angle select signals;

a second analog-to-digital converter connected by said select switch to said input unit when said select switch is operated in the third switch position, said second analog-to-digital converter receiving the viewing angle control signals of the game controller of the third type from said input unit and converting the viewing angle control signals of the game controller of the third type into digitized viewing angle control signals;

a second logic decoder, connected to said second analog-to-digital converter, for converting the digitized viewing angle control signals into decoded viewing angle select signals;

a second key signal converter connected by said select switch to said input unit when said select switch is operated in the third switch position, said second key signal converter receiving the key switch signals of the game controller of the third type from said input unit and converting the key switch signals of the game controller of the third type into digital key switch signals in the USB interface standard-compliant format;

a USB signal converter, connected to said first and second logic decoders, for converting the decoded key switch signals and the decoded viewing angle select signals from said first logic decoder into digital key switch signals and digital viewing angle select signals in the USB interface standard-compliant format, and for converting the decoded viewing angle select signals from said second logic decoder into digital viewing angle select signals in the USB interface standard-compliant format;

a USB driver, connected to said first analog-to-digital converter, said first key signal converter, said second key signal converter and said USB signal converter, for receiving said digital axis signals, said digital key switch signals and said digital viewing angle select signals and for generating the USB port signals; and an output unit connected to said USB driver and adapted to provide the USB signals to a USB port.

* * * * *